(12) United States Patent
Yang et al.

(10) Patent No.: US 12,219,123 B2
(45) Date of Patent: Feb. 4, 2025

(54) METHOD FOR RENDERING DATA OF THREE-DIMENSIONAL IMAGE ADAPTED TO EYE POSITION AND DISPLAY SYSTEM

(71) Applicant: Lixel Inc., Taipei (TW)

(72) Inventors: Chun-Hsiang Yang, Hsinchu (TW); Chih-Hung Ting, New Taipei (TW); Kai-Chieh Chang, Kaohsiung (TW); Hsin-You Hou, New Taipei (TW); Chih-Wei Shih, Hsinchu (TW); Wei-An Chen, Hsinchu County (TW); Kuan-Yu Chen, Taichung (TW)

(73) Assignee: LIXEL INC., Taipei (TW)

( * ) Notice: Subject to any disclaimer, the term of this patent is extended or adjusted under 35 U.S.C. 154(b) by 835 days.

(21) Appl. No.: 17/370,023

(22) Filed: Jul. 8, 2021

(65) Prior Publication Data

US 2022/0317465 A1    Oct. 6, 2022

(30) Foreign Application Priority Data

Mar. 31, 2021  (TW) .................................. 110111884

(51) Int. Cl.
*H04N 13/366*  (2018.01)
*H04N 13/307*  (2018.01)

(52) U.S. Cl.
CPC ......... *H04N 13/366* (2018.05); *H04N 13/307* (2018.05)

(58) Field of Classification Search
CPC . G02B 27/0093; G02B 27/0172; G06F 3/013; H04N 13/307; H04N 13/366

USPC ............................................................ 348/51
See application file for complete search history.

(56) References Cited

U.S. PATENT DOCUMENTS

| 2008/0150936 | A1  | 6/2008 | Karman |
|---|---|---|---|
| 2011/0063289 | A1  | 3/2011 | Gantz |
| 2018/0048883 | A1* | 2/2018 | Yang .................... H04N 13/383 |
| 2019/0129192 | A1* | 5/2019 | Yang .................... G02B 30/26 |
| 2021/0021804 | A1  | 1/2021 | Yang et al. |

* cited by examiner

Primary Examiner — Christopher S Kelley
Assistant Examiner — Ana Picon-Feliciano
(74) Attorney, Agent, or Firm — Li & Cai Intellectual Property (USA) Office

(57) ABSTRACT

A method for rendering data of a three-dimensional image adapted to an eye position and a display system are provided. The method is used to render the three-dimensional image to be displayed in a three-dimensional space. In the method, a three-dimensional image data used to describe the three-dimensional image is obtained. The eye position of a user is detected. The ray-tracing information between the eye position and each lens unit of a multi-optical element module forms a region of visibility (RoV) that may cover a portion of the three-dimensional image in the three-dimensional space. When coordinating the physical characteristics of a display panel and the multi-optical element module, a plurality of elemental images can be obtained. The elemental images form an integral image that records the three-dimensional image data adapted to the eye position, and the integral image is used to reconstruct the three-dimensional image.

8 Claims, 8 Drawing Sheets

METHOD FOR RENDERING DATA OF THREE-DIMENSIONAL IMAGE ADAPTED TO EYE POSITION AND DISPLAY SYSTEM

CROSS-REFERENCE TO RELATED PATENT APPLICATION

This application claims the benefit of priority to Taiwan Patent Application No. 110111884, filed on Mar. 31, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a technology of displaying a three-dimensional image, and more particularly to a method for rendering data of a three-dimensional image adapted to an eye position that can adjust the three-dimensional image data according to the eye position and a display system.

BACKGROUND OF THE DISCLOSURE

Most conventional technologies for generating 3D images are based on the principle of binocular parallax with respect to one object. Therefore, one kind of the three-dimensional images is formed from two images that contain differences observable by the human eye. The other kind of the three-dimensional images is formed in the human eye by playing a series of different images in a loop. A pair of special glasses, e.g. anaglyph glasses, polarizing glasses or shutter glasses, is usually required to see the 3D image. The images are projected onto the human eye, and are formed in the brain as the 3D image with a depth as a result of the binocular parallax.

One other way of generating 3D images is through a three-dimensional display device that includes optical elements. Without any special glasses, the display device allows users to see 3D images through naked eyes. In this situation, the users can see the 3D images with a depth at a specific viewing angle when the eyes receive the images that contain differences.

In the conventional technologies that enable the user to view the three-dimensional images, a viewing position of the user is not taken into consideration. Furthermore, the user may even be requested to view the image at a specific position, and no solution has been offered in this respect.

SUMMARY OF THE DISCLOSURE

In order to resolve the inadequacies of conventional technologies in which a three-dimensional image is displayed without taking an eye position into consideration, the present disclosure provides a method for rendering data of a three-dimensional image adapted to an eye position and a display system.

In an embodiment of the present disclosure, the display system includes a multi-optical element module. The multi-optical element module consists essentially of a plurality of lens units for rendering the three-dimensional image. The display system includes a display panel that is used to display an integral image that is composed of a plurality of elemental images. The three-dimensional image is shown when the integral image is projected to a space through the multi-optical element module. The display system includes a display driving unit that is used to drive a display unit to display the integral image, and also includes an image processing unit that performs the method for rendering data of a three-dimensional image adapted to an eye position. The three-dimensional image data describing three-dimensional spatial information of the three-dimensional image is used to form the integral image that is adapted to the eye position.

To render the integral image, the three-dimensional image data used to describe the three-dimensional image and physical characteristics of the display panel and the multi-optical element module of the display system can be obtained in advance. In addition, the eye position of a user is detected. Then, a region of visibility (RoV) is formed according to ray-tracing information between the eye position and each of the lens units of the multi-optical element module. The display system relies on every portion of the three-dimensional image covered by every region of visibility of each of the lens units, physical characteristics of the display panel and the multi-optical element module, and positions of pixels of the display panel to generate the elemental images. The plurality of elemental images corresponding to the plurality of lens units are generated. The plurality of elemental images form the integral image that records the three-dimensional data adapted to the eye position.

Preferably, the three-dimensional image data also records color information of the three-dimensional image. The three-dimensional spatial information includes coordinates and chromatic values of each of the pixels. The physical characteristics of the display panel and the multi-optical element module include coordinates, a size and a refractive index of each of the lens units of the multi-optical element module, and a spatial relationship between every lens unit and the display panel.

Further, positions and sizes of the elemental images corresponding to the different lens units vary due to different ray-tracing results. The integral image formed by the elemental images is displayed on the display panel, and reconstructs the three-dimensional image adapted to the eye position after being projected through the image through the multi-optical element module.

Still further, when the three-dimensional image data is a dynamic three-dimensional image, the abovementioned steps of the method are repeated to render a plurality of the integral images adapted to the eye position in a consecutive manner, so as to reconstruct the dynamic three-dimensional image through the multi-optical element module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
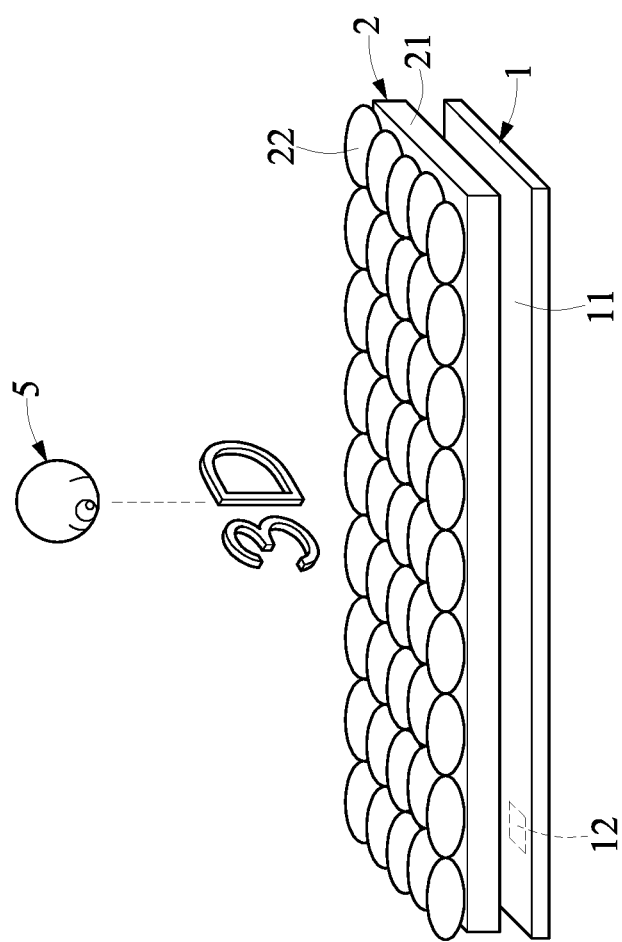
FIG. 1 is a schematic diagram depicting a display device of a display system for rendering a three-dimensional image according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to a method for rendering data of a three-dimensional image adapted to an eye position and a display system. The method is adapted to a display device including multi-optical elements for purposes of rendering the three-dimensional image. FIG. 1 shows a schematic diagram of the display device according to one embodiment of the disclosure.

This diagram shows the structure of the display device of the three-dimensional image display system. A three-dimensional display device can be a liquid-crystal display panel having a backlight module (not shown in the diagram). The backlight module may be a self-emissive organic light-emitting diode (OLED), and is not limited to any specific type of backlight. A display image 11 displayed on a display panel 1 is an integral image that is created by the method for rendering a three-dimensional image as described in FIG. 6. The integral image is a plane image composed of a plurality of elemental images. The elemental images are images correspond to a plurality of lens sets that compose a multi-optical element module 2. Each of the elemental images of the display image 11 can correspond to the images of each lens set in a one-to-one, one-to-many or many-to-one manner.

In the multi-optical element module 2, a base 21 and a lens assembly 22 are included. Each optical element of the lens assembly 22 can be one lens set. The lens set can be composed of one or more convex lenses and concave lenses. The multi-optical elements form a lens array. A three-dimensional image is displayed through the multi-optical element module 2. Where a viewing position 5 is and its angle relative to the display device will affect the formation of the integral image and the elemental image. An image processing unit 12 of the display device is generally used to process input images, e.g., rendering the three-dimensional image, and is also used to render the integral image. According to the viewing position 5, a position for displaying the three-dimensional image, the physical properties of the lens sets of the multi-optical element module 2, and spatial relationships among the elements of the display device, the image processing unit 12 is capable of adjusting a reference image, calculating the elemental images, and rendering the integral image. In one embodiment of the method for rendering the three-dimensional image adapted to the eye position, if a user changes the viewing position 5, a proper viewing content that is adapted to the viewing position 5 can be provided to the user.

The display device can be an electronic device that includes a flat-panel display, such as a mobile phone, a tablet computer or a personal computer. The display panel 1 is disposed at a lower layer of the display device. The display panel 1 is in charge of displaying a plane image that has not yet been reconstructed by light. In general, the display panel 1 is mainly used to display the integral image. The multi-optical element module 2 is disposed at an upper layer of the display device. The multi-optical element module 2 is configured to regulate a light field. For example, an angle of light for the three-dimensional image can be regulated, so as to re-arrange and compose the plane image that has not yet been re-arranged. In the present embodiment, the integral image can be configured to display the three-dimensional image by rearranging and combining the lights through the multi-optical element module 2.

The multi-optical element module 2 may exemplarily be a lens array that includes multiple lens sets. The lens assembly 22 is therefore formed. The physical properties of the lens assembly 22 are, for example, a refraction index and transmittance that are subject to the texture and curvature of the lens. A height, a range of a viewing angle, and a resolution of the three-dimensional image can be determined by the number and arrangement of the lens sets of the lens array in cooperation with a configuration of the display panel 1.

In various embodiments, the lens set can be a single lens, a lens array, a lenticular lens, or a Fresnel lens. During the process of imaging, a pin hole, a pin hole array, a barrier and/or a specific point light source can be applied to the imaging. The display device for displaying the three-dimensional image can be a display that includes one type of the lens set or a display array that includes more than two types of the lens set. The display panel displays the image, and the display array projects the three-dimensional image at a predetermined position.

Figure 2:
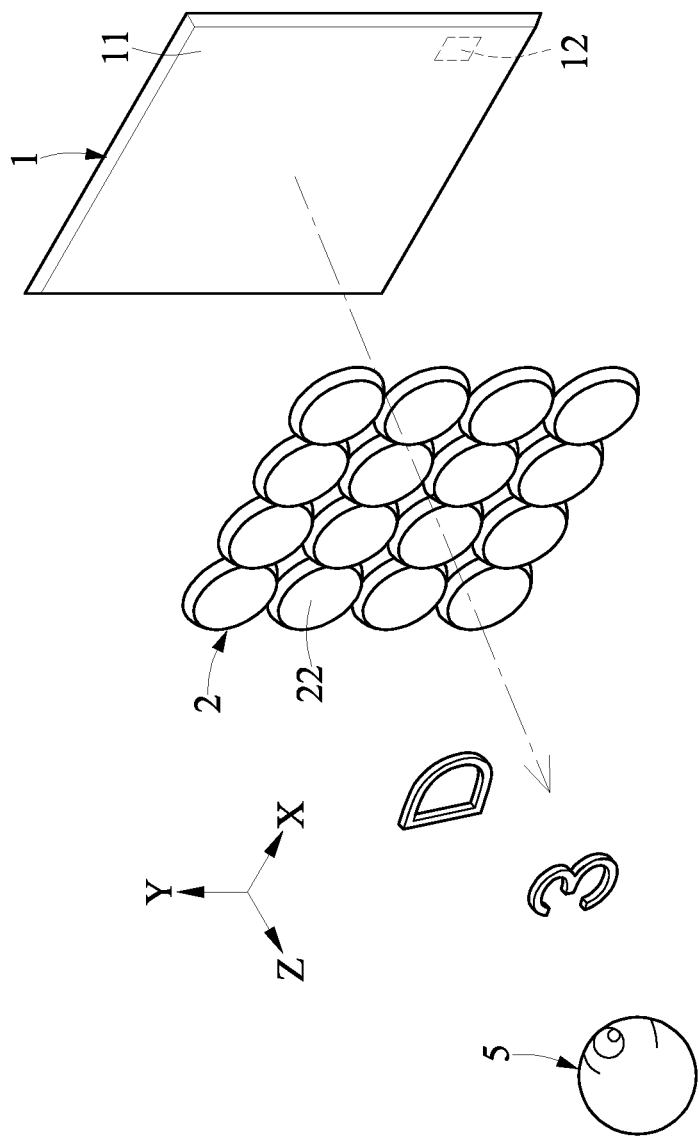
FIG. 2 is another schematic diagram depicting the display device of the display system for rendering the three-dimensional image according to one embodiment of the present disclosure.

Reference is next made to FIG. 2, which shows another schematic diagram of the display device for displaying the three-dimensional image according to one embodiment of the present disclosure. In the method for rendering the 3D image, the display panel 1 of the three-dimensional display device displays the integral image by arranging the elemental images. The three-dimensional image can therefore be reconstructed through the multi-optical element module 2.

According to the embodiment shown in the diagram (also shown in FIG. 1), the user is allowed to see a floating three-dimensional image from the viewing position 5. The three-dimensional image is the display image 11 that is displayed through the display panel 1. This display image 11 is an integral image rendered from the elemental images. Every elemental image corresponds to one optical element of the multi-optical element module 2. The optical element is one lens set.

The floating three-dimensional image is rendered through the multi-optical element module 2. The lens sets of the lens assembly 22 are disposed at different positions and allow the user to view the image at the viewing position 5. The image passing through every lens set is projected onto a predetermined spatial position. The lens sets at different positions render different images since the elemental images corresponding to the optical elements have a difference from each other.

For example, while projecting one floating three-dimensional image, the optical element on the left side of the projected three-dimensional image should project an elemental image with a projection angle to the left of the three-dimensional image. Similarly, the optical element on the right side of the projected three-dimensional image should project the elemental image with a projection angle to the right of the three-dimensional image. Further, the optical elements below the three-dimensional image should project an upward image and onto the human eyes with a real image through the elemental images that are just below the three-dimensional image. Moreover, there is a distance between the floating three-dimensional image that is displayed as floating in the air and a display plane. The floating image can be sunk down in the display plane in other embodiments.

Figure 3:
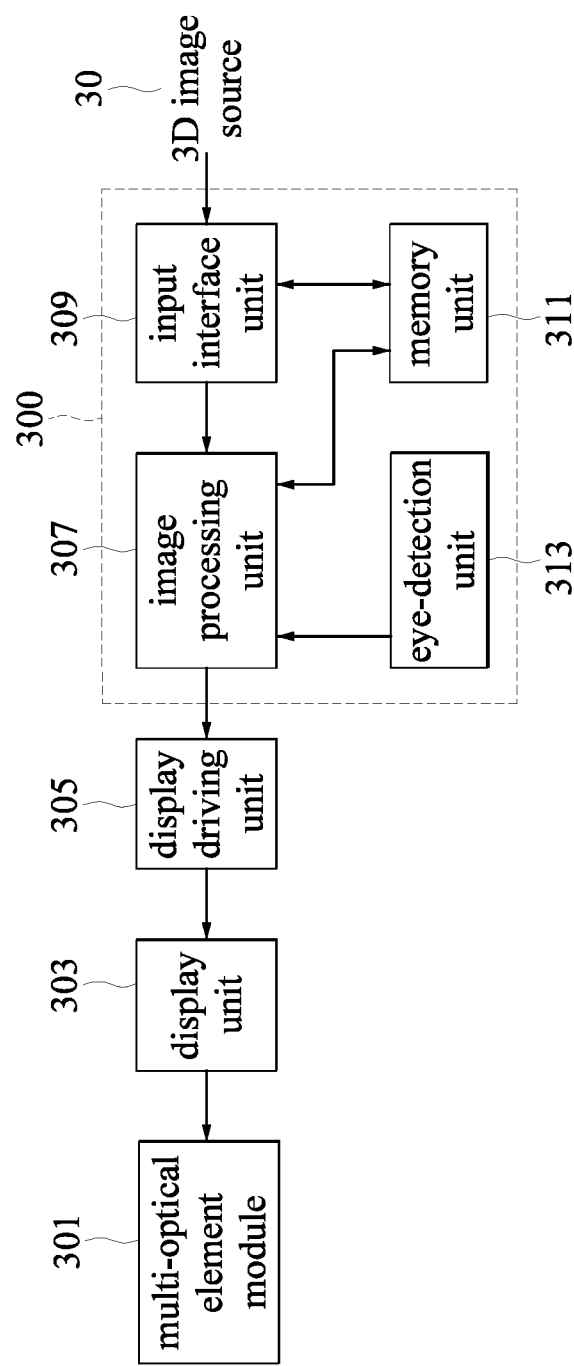
FIG. 3 is a circuit block diagram of the display system for rendering the three-dimensional image according to one embodiment of the present disclosure.

The display system for rendering the three-dimensional image can be implemented by a circuitry system. Reference is made to FIG. 3, which shows a circuit block diagram describing the display system.

The display system for rendering the three-dimensional image adapted to the eye position can be implemented by a combination of hardware and software. The hardware portion of the system can be, for example, a display device. Circuit units that are electrically interconnected are schematically shown in the diagram. The main components of the system include a multi-optical element module 301 that is composed of multiple optical elements. The multi-optical element module 301 renders the three-dimensional image. As described in the embodiments described in FIG. 1 or FIG. 2, the optical element is a lens set that is composed of one or more convex lenses or concave lenses, and the multi-optical elements form a lens array. The display system includes a display unit 303 that includes a display panel for displaying an integral image. The integral image is projected through the multi-optical element module 301, so as to generate the three-dimensional image.

The display system includes a display driving unit 305 that serves as a driving circuit for the display panel. The display driving unit 305 drives the display panel to generate image control signals for the display unit 303 to display the integral image. The display system includes an image processing unit 307. According to one embodiment, the image processing unit 307 can be an image processing IC. For rendering the three-dimensional image, the image processing unit 307 can be implemented by a digital signal processor (DSP) or a module of software. This image processing unit 307 is the main circuit to perform the method for rendering the three-dimensional image. The image processing unit 307 is electrically connected to a memory unit 311 that is used to store the three-dimensional image data received via an input interface unit 309. The memory unit 311 is, for example, a main memory of the system. The memory unit 311 is used to buffer image data, system operation instructions and calculation instructions. The memory unit 311 provides adequate instructions for calculation and the related image data. The memory unit 311 may act as a buffer that is used to buffer the data that is generated when the system is in operation.

The image processing unit 307 is also electrically connected to an eye-detection unit 313 that is used to detect the eye position. The eye-detection unit 313 can be a circuit module or an independent device disposed around the display unit 303 and the multi-optical element module 301. The eye-detection unit 313 relies on software (which performs an image processing method) and hardware (such as a camera) to acquire a face image of the user and to obtain the eye position according to image features of eyes. The eye position can be the position of one or two eyes of the user. The eye position can be indicated by a set of coordinates that can be transformed to the coordinates in a coordinate system of the three-dimensional display device. When the eye position is obtained, a three-dimensional image data corresponding to the three-dimensional image adapted to the eye position can be retrieved from the memory unit 311 by the image processing unit 307. On the other hand, when the display system records the image data in a three-dimensional space, the eye position is first obtained by a software process or the eye-detection unit 313. Then, the data including the eye position, the three-dimensional image to be displayed and the lens units of the multi-optical element module 301 are provided to calculate the elemental images corresponding to the lens units. The elemental images are stored to the memory unit 311.

The display system for rendering the three-dimensional image display system includes the image processing unit 307, the input interface unit 309, the memory unit 311 and the eye-detection unit 313 that are to embody a calculation circuit 300 used for rendering the three-dimensional image data adapted to the eye position. The calculation circuit 300 connects to an external 3D image source 30 via the input interface unit 309. The image-processing unit 307 receives the three-dimensional image data which is used to describe the three-dimensional spatial information of a three-dimensional image via the input interface unit 309 before performing the method for rendering data of a three-dimensional image adapted to an eye position. The 3D image source 30 can be 3D images drawn by specific hardware and software, where information such as three-dimensional coordinates and chromaticity (which includes the chromatic information of the three-dimensional image and 3D spatial information) are recorded in the 3D images. Further, a two-dimensional image and a depth map can be included in the information of the 3D image.

A spatial relationship is established according to the three-dimensional image information. In practice, the information may be reflected by one reference image that reflects the spatial relationship. The reference image can reflect the three-dimensional image. The reference image is created through hardware of the system and by the user who sets up the system for rendering the three-dimensional image. Next, the system calculates the elemental images corresponding to the optical elements according to the position of the human eye(s), the reference image and the physical information of the multi-optical element module 301. The system renders the integral image provided for the display unit 303 to display according to the elemental images of the multi-optical elements. The integral image is used to show the three-dimensional image through the multi-optical element module 301 when the display driving unit 305 drives the displaying.

The physical information relating to the multi-optical element module is mainly associated with the physical properties of the optical elements, and also includes a spatial relationship between the spatial position for projecting the three-dimensional image and each optical element. The optical elements are, for example, the lens sets forming the lens array. The physical properties are, for example, a refractive index of the lens, an arrangement position of each of the lens sets, and a distance between the adjacent lens sets. For example, the spatial relationship includes a distance between the three-dimensional image and every optical element (e.g. the lens set), and a relative angle therebetween. Further, the spatial relationship includes another distance between every optical element and the display panel of the display unit 303.

The spatial relationship can be understood by placing the system in an identical spatial coordinate. Therefore, the distance and the relative angle between the three-dimensional image and every optical element are calculated according to the spatial coordinates of the three-dimensional image and the coordinates of every optical element, and the relative positions among the optical elements of the system can also be obtained. A distance between every optical element and the display panel can be obtained. The spatial relationship may also include the relative position of each optical element of the multi-optical element module, and a distance between every optical element and the display panel. The spatial relationship is introduced to the calculation with the sizes of image pixels. The various spatial relationships become the inputs for the method for rendering the three-dimensional image adapted to the position of eye. The inputs of the method further include a viewing position of the user, so as to set up an oblique angle for displaying the three-dimensional image. A ray tracing is then introduced to the method according to the position of the human eye in order to create the plurality of elemental images, and the display panel displays the integral image adapted to the position of eye that is not yet reconstructed.

Figure 4:
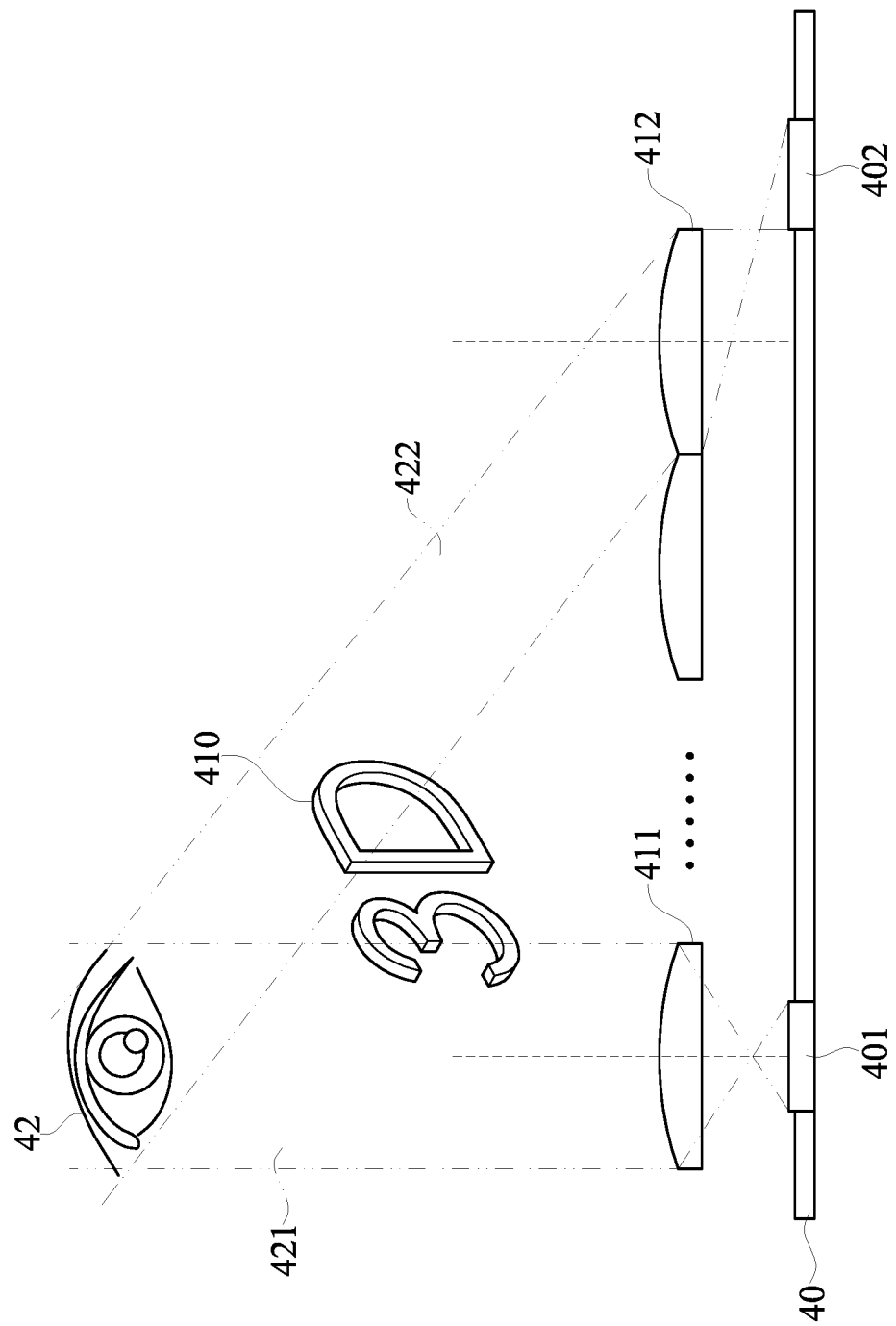
FIG. 4 is a schematic diagram depicting an elemental image being formed by a ray-tracing process based on an eye position in a method for rendering data of a three-dimensional image adapted to an eye position according to one embodiment of the present disclosure.
Figure 6:
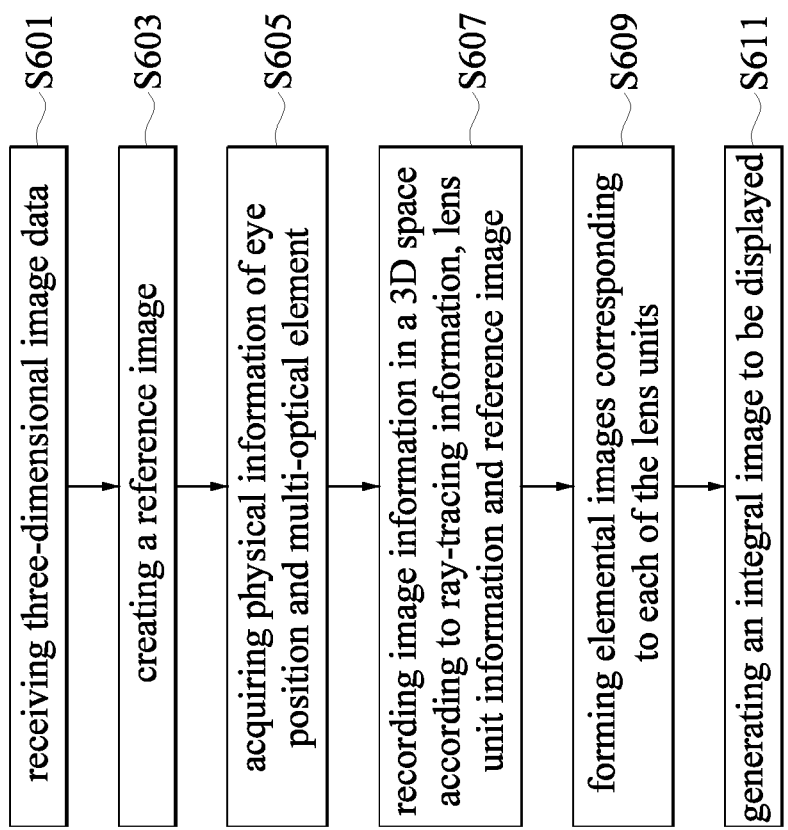
FIG. 6 is a flow chart illustrating how an integral image is formed in the method for rendering data of a three-dimensional image adapted to an eye position according to one embodiment of the present disclosure.

FIG. 4 is a schematic diagram depicting the elemental images being formed by a ray-tracing process based on the eye position in the method for rendering data of a three-dimensional image adapted to an eye position according to one embodiment of the present disclosure. Reference is also made to FIG. 6, which shows a flow chart that describes a process for rendering the elemental images and the integral image according to one embodiment of the present disclosure.

In the diagram, a user's eye 42 is schematically shown above a three-dimensional image display device to view a three-dimensional image 410. The three-dimensional image 410 that is projected onto a three-dimensional space is floating above a display panel 40 through an array of lens sets in a multi-optical element module of the display device. This floating three-dimensional image 410 is exemplarily shown as a word '3D.' Before the three-dimensional image 410 is rendered, the three-dimensional image to be displayed is firstly determined. For example, a three-dimensional image data is retrieved from a 3D image source (step S601, FIG. 6). A reference image corresponding to the three-dimensional image 410 shown in FIG. 4 is formed (step S603, FIG. 6). The three-dimensional image information related to the reference image includes color information and three-dimensional spatial information of the three-dimensional image 410. Each of pixels of the image in the three-dimensional space includes a set of coordinates (x, y, z) and chromatic values. The three-dimensional image information can also be related to a plane image and a depth map. Afterwards, an eye position is set, or is obtained by detecting the eye position of an actual user. Further, in step S605 of FIG. 6, the position of eye position including a distance from the multi-optical element module is acquired. The system also obtains the physical information of multiple optical elements of the multi-optical element module. The physical information includes the size and properties of the optical element, such as the coordinates, the size and refractive index of the single lens set and the lens array, and the spatial relationships of the optical elements. The spatial relationships of the optical elements include the spatial position related to the single optical element, the spatial relationship (e.g., distance) between each optical element and the display panel, and the spatial relationship between the spatial position and every optical element.

It should be noted that, when reproducing the three-dimensional image, the planar coordinates (x, y) are cooperated with the depth value (z) recorded in the depth map with respect to each of the pixels for illustrating the coordinates (x, y, z) of the three-dimensional image. If the coordinates (x, y, z) are cooperated with the chromatic values, the three-dimensional image with correct spatial positions and colors is rendered. After that, the reference image is generated according to the three-dimensional image data, the eye position and the positions for projecting the three-dimensional image. The reference image is used to represent the 3D coordinates and chromaticity of the display image. In one embodiment, the original three-dimensional image inputted to the system is converted to the reference image through a coordinate transformation. A coordinate transformation algorithm is particularly utilized to compute a set of transformation parameters.

When acquiring the eye position, ray-tracing information between the eye position and each lens unit is established. The ray-tracing information among the eye 42, the lens units (411, 412) and corresponding elemental images (421, 422) defines a region of visibility (RoV) according to one embodiment of the present disclosure. The region of visibility (RoV) is provided to describe a range defined by the positions of edges of the eye 42 and the positions of edges of each of the lens units of the multi-optical element module. The region of visibility may cover a portion of the three-dimensional image 410. In FIG. 4, the ray-tracing information between the eye 42 and a first lens unit 411 forms a first ROV 421, the ray-tracing information between the eye 42 and a second lens unit 412 forms a second ROV 422, and so on. The eye 42 and each of the lens units of the multi-optical element module can form multiple regions of visibility, in which each of the regions of visibility covers one portion of the three-dimensional image 410 and is used to calculate a corresponding one of the elemental images (401, 402) with a specific content and size.

In the present example, the first ROV 421 and second ROV 422 can be used to correspondingly calculate a first elemental image 401 and a second elemental image 402 according to optical characteristics of the corresponding first lens unit 411 and second lens unit 412. The optical characteristics can be a lens thickness, an area, a surface curvature, and a reactive index of the lens unit. Further, a distance between the display panel and each of the lens units of the multi-optical element module can also be considered to calculate the elemental image, such as the first elemental image 401 or the second elemental image 402. Finally, the ray-tracing information, information of multiple lens units and the reference image are provided to record an image data in a three-dimensional space. The image data of the three-dimensional image 410 records the positions of pixels of the display panel corresponding to each of the regions of visibility (step S607). In practice, a memory of a computer system is used to stores pixel values of the pixels of the display panel, and the pixel values are generated according to the information of three-dimensional coordinates and chromatic values of the pixels of the three-dimensional image 410 projected to the three-dimensional space through the multi-optical element module.

According to one of the embodiments of the present disclosure, in the method for rendering data of a three-dimensional image adapted to an eye position, a coordinate transformation function between an original three-dimensional image and the reference image is provided. The reference image is used to render the multiple elemental images corresponding to the multiple optical elements (e.g., the lens units) based on characteristics of hardware, such as the physical information of the lens unit and the display panel, and the coordinate transformation function. The elemental images corresponding to the lens units have differences in their positions and sizes since they have different ray-tracing results (step S609). The elemental images which are displayed on the display panel forms an integral image that is used to render the three-dimensional image 410 adapted to the eye position (step S611). Later, the integral image can be used to reconstruct the three-dimensional image 401 according to the position of the eye 42.

FIG. 4 also shows that the lens units at different positions correspond to the elemental images with different positions, sizes and contents. When the position of the eye 42 changes, the result of the ray-tracing process in the method for rendering data of a three-dimensional image adapted to an eye position of FIG. 6 also changes. The elemental images and the final integral image will be different since the result of the ray-tracing process changes.

Figure 5A:
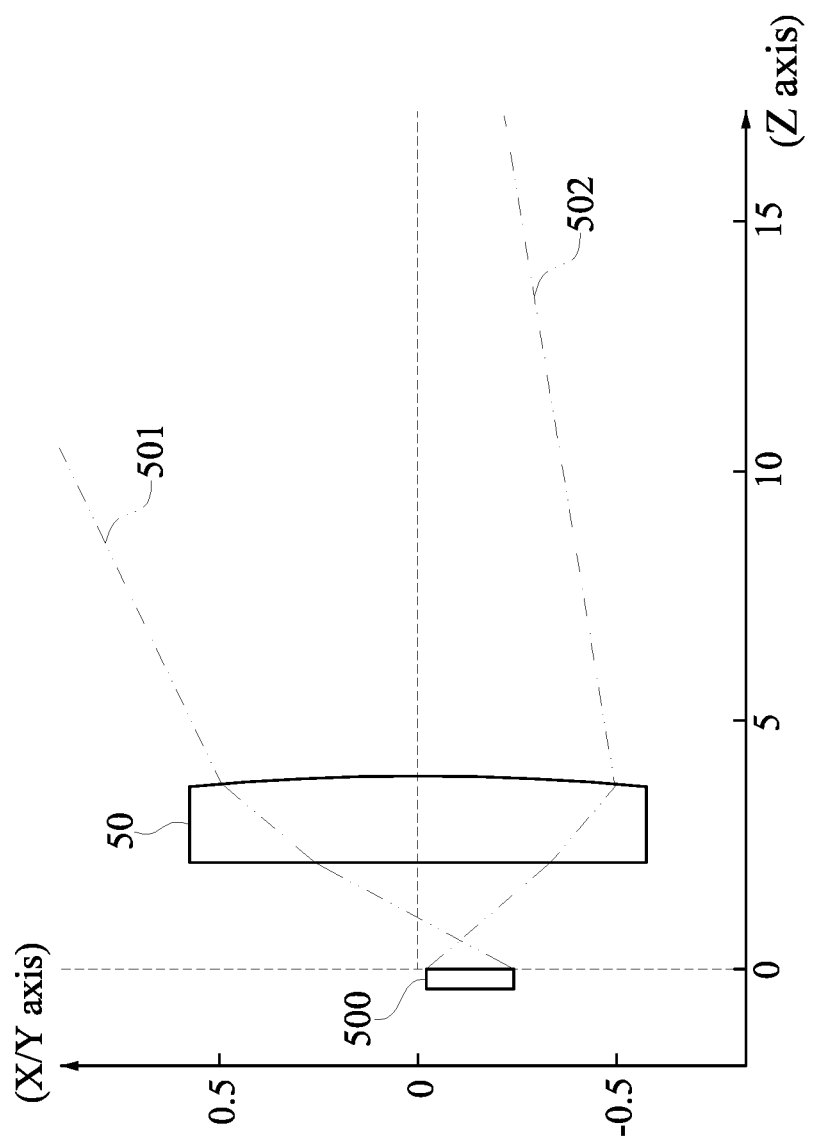
FIG. 5A and FIG. 5B are each another schematic diagram depicting the elemental image being formed by the ray-tracing process in the method for rendering data of a three-dimensional image adapted to an eye position according to one embodiment of the present disclosure.
Figure 5B:
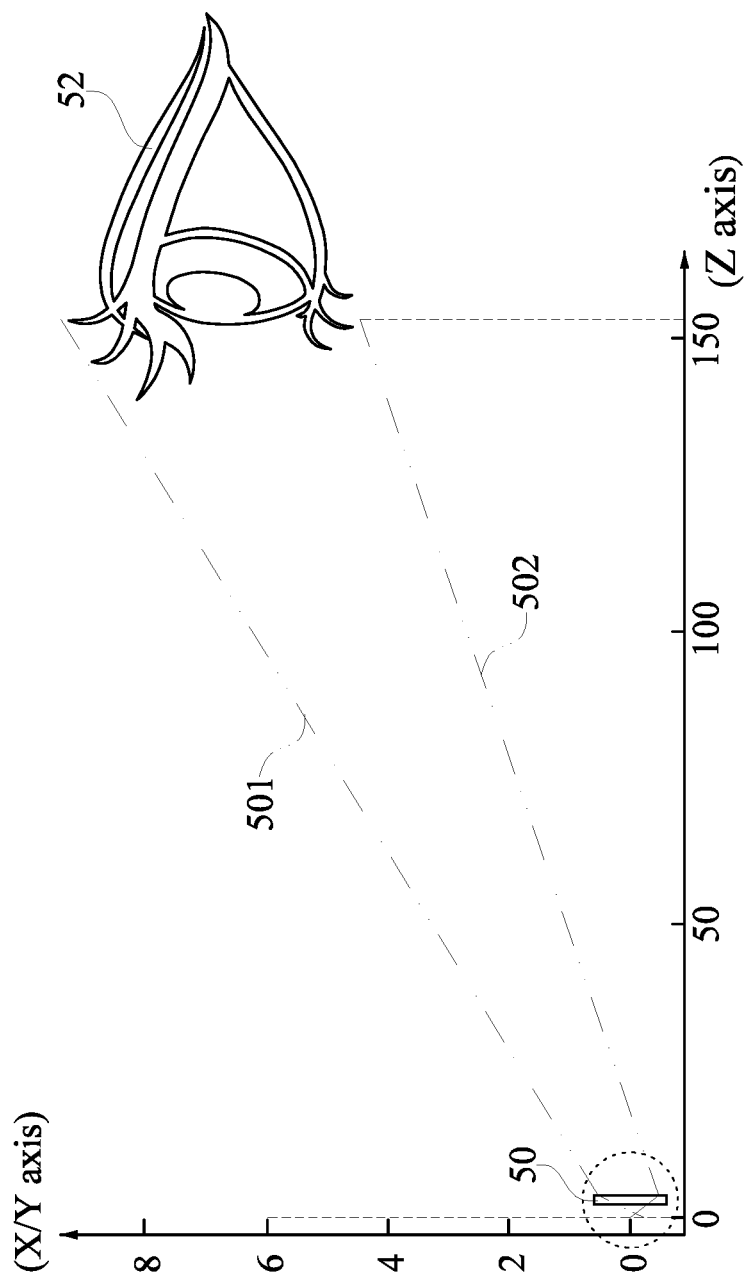

FIG. 5A and FIG. 5B show one further embodiment of the present disclosure that depicts an elemental image rendered by ray-tracing process in the method for rendering data of a three-dimensional image adapted to an eye position.

Two coordinate maps are shown in FIG. 5A and FIG. 5B, respectively. The coordinate maps depict the elements of the display system for rendering the three-dimensional image in X, Y and Z axial directions. A lens unit 50 of the multi-optical element module is around an origin (0) of the coordinate system. The lens unit 50 can be a single lens of the multi-optical element module or the lens in the three-dimensional image display device shown in FIG. 1 or FIG. 2. A light track is formed from the lens unit 50 which can be representative of any other lens unit to an eye 52. It should be noted that the above-mentioned eye 52 can be representative of one or two eyes, and two integral images relative to the two eyes may be obtained.

In FIG. 5A, in accordance with a ray-tracing principle, the region of visibility (RoV) can be determined according to the positions of the edge of the eye 52 and the edge of the lens unit 50. It should be noted that the various positions of the lens units form the different regions of visibility. In the diagram, the region of visibility is defined by a range between a first ray 501 and a second ray 502. A corresponding three-dimensional image data can therefore be acquired when the physical properties of the lens unit 50 (such as a refractive index and a thickness of the lens) are taken into consideration. The three-dimensional image data which is described in a coordinate system is used to render a three-dimensional image floating above the display panel. Afterwards, based on the regions of visibility and the three-dimensional image data, every portion of the three-dimensional image covered by each of the regions of visibility is determined. The positions and sizes of each of the elemental images are also determined by the eye position and the spatial relationships between the display panel and the lens units. For example, in the diagram, an elemental image 500 corresponding to the lens unit 50 is formed at a dotted line that represents the position of the display panel, i.e., the position '0' of Z axis. FIG. 5B shows one further diagram depicting the region of visibility being defined by the range between the first ray 501 and the second ray 502 which are from the lens unit 50 to the eye 52. Similarly, the ray-tracing principle allows the system to depict every region of visibility between the eye 52 and each individual lens unit of the multi-optical element module. The three-dimensional coordinates and chromatic value of each of the pixels within every region of visibility that covers a certain portion of the reference image can be obtained, so as to render a corresponding elemental image.

It should be noted that the reference image is rendered based on the positions of the optical elements of the display panel. The optical elements can be set up in the display panel in one-to-one, one-to-multiple or multiple-to-one manner. To render the reference image, the system does not have to refer to the user's viewing position. However, the system still allows the user to view the three-dimensional image from an oblique viewing angle. Therefore, through the method for rendering the three-dimensional image adapted to the position of eye of the present disclosure, especially for the multi-optical element module having the lens array, the elemental images may be altered based on a specific circumstance, i.e., changes of the position of the human eye. The three-dimensional image can be reconstructed in a floating manner above the display device, in a sunken manner below the display device, or in front of or at the rear of the display device when the lights are converged through the multi-optical elements. The algorithm acknowledges the diversities among the elemental images and the integral image from the reference image based on the user's requirements (including the user's viewing position).

Figure 7:
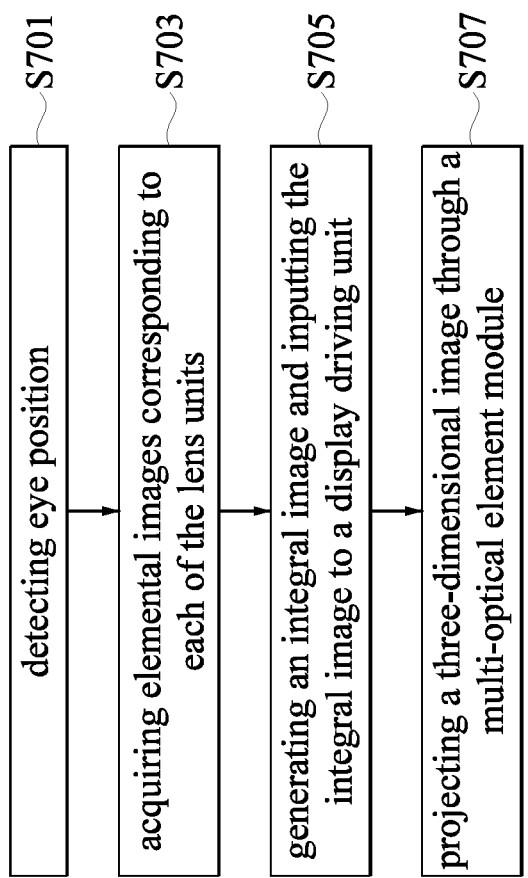
FIG. 7 is a flow chart describing the method for rendering data of a three-dimensional image adapted to an eye position according to one embodiment of the present disclosure.

Reference is next made to FIG. 7, which shows a flowchart depicting the method for displaying the three-dimensional image in one embodiment of the disclosure. The 3D image is imaged by the display device. The relative positions of the three-dimensional image and the display device are not limited in the present embodiment. The method can also be applied to render one or more 3D images through two or more display devices in one system.

As described in the above-mentioned embodiment, such as in step S701 of FIG. 7, an eye position is firstly detected based on facial and eye features. After confirming a three-dimensional image to be displayed, in a next step S703, an integral image composed of multiple elemental images corresponding to each of the lens units can be retrieved from a memory of a display system. Next, such as in step S705, the integral image is inputted to the display driving unit of the display system. The display driving unit acts as a driving circuit for driving the display unit to display the image. The integral image is thus displayed through the multi-optical element module. In step S707, the elemental images are respectively projected through their corresponding optical elements based on the eye position.

In the process of imaging, the three-dimensional image can be displayed above, below, in front of or behind a display plane formed through the multi-optical elements of the display device. If the three-dimensional image information involves a dynamic three-dimensional image, a series of reference images reflecting the altered spatial relationships are created, the elemental images adapted to the eye position are calculated in advance and then stored to the memory. Afterwards, a plurality of the integral images are outputted. The dynamic three-dimensional image is reconstructed through the multi-optical elements through the process described in FIG. 7. Furthermore, in an aspect of the disclosure, these steps in the method can be repeated to render the plurality of the integral images adapted to the eye position in a consecutive manner instantaneously.

In conclusion, according to the above embodiments of the method for rendering data of a three-dimensional image adapted to an eye position and the display system, different from the conventional technologies for rendering data of a three-dimensional image in which the eye position is not taken into consideration, the method of the present disclosure incorporates a ray-tracing method to determine the region of visibility through a ray-tracing technology based on the eye position. The elemental images will be modified based on the eye position. Therefore, since the three-dimensional image data adapted to the eye position can be provided by detecting the viewing position of the user, the method of the present disclosure successfully solves the problem that the user may only see a poor three-dimensional image due to his poor viewing position.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for rendering data of a three-dimensional image adapted to an eye position, comprising:
    retrieving a three-dimensional image data that records three-dimensional spatial information of the three-dimensional image;
    acquiring the eye position and physical characteristics of a display panel and a multi-optical element module of a display system, wherein the physical characteristics include coordinates and a specification of each of the plurality of lens units, and a spatial relationship between each of the plurality of lens units and the display panel;
    creating a reference image that is used for reflecting the three-dimensional image to be finally displayed by the display system based on the three-dimensional image data, the eye position and the positions for projecting the three-dimensional image;
    forming one of a plurality of regions of visibility based on ray-tracing information between the eye position and each of a plurality of lens units of the multi-optical element module;
    rendering a plurality of elemental images to be displayed on the display panel, wherein positions and sizes of the plurality of elemental images corresponding to different ones of the plurality of lens units of the multi-optical element module are determined according to corresponding ray-tracing results and based on multiple portions of the three-dimensional image covered by the regions of visibility and the physical characteristics of the display panel and the multi-optical element module; and
    forming, by the plurality of elemental images, an integral image that records the three-dimensional image data adapted to the eye position;
    wherein, the ray-tracing information, the plurality of lens units and corresponding elemental images defines the region of visibility, and the region of visibility is provided to describe a range defined by positions of edges of the eye and positions of edges of each of the plurality of lens units of the multi-optical element module.

2. The method according to claim 1, wherein the three-dimensional image data further records color information of the three-dimensional image, and the three-dimensional spatial information includes coordinates and chromatic values of each of a plurality of pixels that is configured to be displayed in a three-dimensional space.

3. The method according to claim 1, wherein the integral image formed by the elemental images is displayed on the display panel and reconstructs the three-dimensional image adapted to the eye position after being projected through the multi-optical element module.

4. The method according to claim 3, wherein, when the three-dimensional image data is a dynamic three-dimensional image, the method is repeated to render a plurality of the integral images adapted to the eye position in a consecutive manner, so as to reconstruct the dynamic three-dimensional image through the multi-optical element module.

5. A display system, comprising:
    a multi-optical element module including a plurality of lens units which are used to display a three-dimensional image;
    a display panel used to display an integral image, wherein the integral image is composed of a plurality of elemental images that integrally display the three-dimensional image through the multi-optical element module;
    a display driving unit used to drive a display unit to display the integral image; and
    an image processing unit used to form the integral image adapted to an eye position by processing a three-dimensional image data that describes three-dimensional spatial information of the three-dimensional image, wherein the integral image is formed by steps including:

acquiring the eye position and physical characteristics of a display panel and a multi-optical element module of the display system, wherein the physical characteristics include coordinates and a specification of each of the plurality of lens units, and a spatial relationship between each of the plurality of lens units and the display panel;

creating a reference image that is used for reflecting the three-dimensional image to be finally displayed by the display system based on the three-dimensional image data, the eye position and the positions for projecting the three-dimensional image;

forming one of a plurality of regions of visibility based on ray-tracing information between the eye position and each of a plurality of lens units of the multi-optical element module;

rendering a plurality of elemental images to be displayed on the display panel, wherein positions and sizes of the plurality of elemental images corresponding to different ones of the plurality of lens units of the multi-optical element module are determined according to corresponding ray-tracing results and based on multiple portions of the three-dimensional image covered by the regions of visibility and the physical characteristics of the display panel and the multi-optical element module; and forming, by the plurality of elemental images, the integral image that records the three-dimensional image data adapted to the eye position;

wherein, the ray-tracing information, the plurality of lens units and corresponding elemental images defines the region of visibility, and the region of visibility is provided to describe a range defined by positions of edges of the eye and positions of edges of each of the plurality of lens units of the multi-optical element module.

6. The display system according to claim 5, wherein the three-dimensional image data further records color information of the three-dimensional image, and the three-dimensional spatial information includes coordinates and chromatic values of each of a plurality of pixels that is configured to be displayed in a three-dimensional space.

7. The display system according to claim 5, wherein the integral image formed by the elemental images is displayed on the display panel and reconstructs the three-dimensional image adapted to the eye position after being projected through the multi-optical element module.

8. The display system according to claim 7, wherein, when the three-dimensional image data is a dynamic three-dimensional image, a method for rendering data of the three-dimensional image adapted to the eye position is repeated to render a plurality of the integral images adapted to the eye position in a consecutive manner, so as to reconstruct the dynamic three-dimensional image through the multi-optical element module.

* * * * *